March 11, 1952     F. P. DUNN     2,588,502

PARKING WAY CONTROL SYSTEM

Filed May 9, 1947     6 Sheets-Sheet 1

FRED P. DUNN
INVENTOR.

BY
ATTORNEY

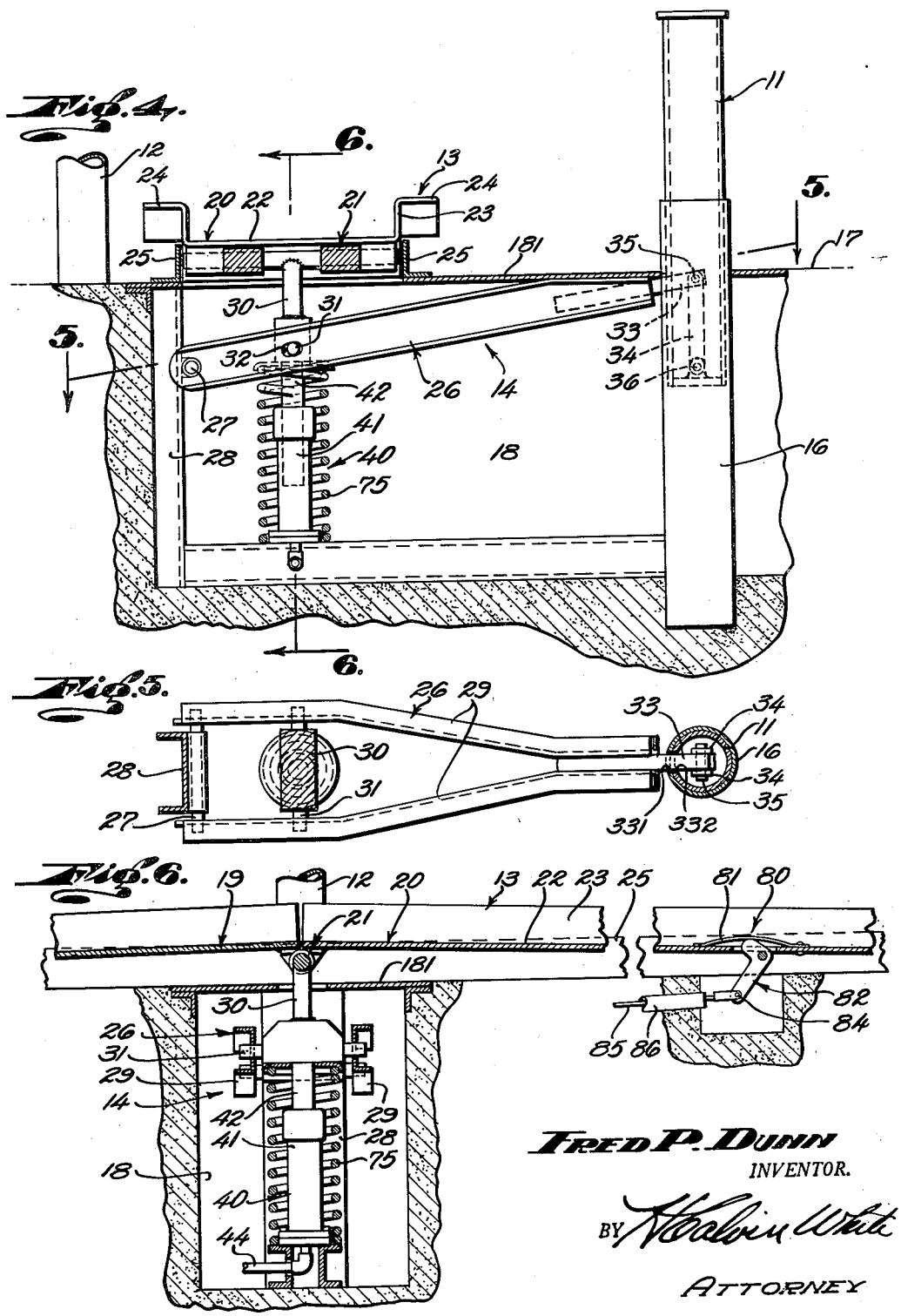

March 11, 1952  F. P. DUNN  2,588,502
PARKING WAY CONTROL SYSTEM
Filed May 9, 1947  6 Sheets-Sheet 3
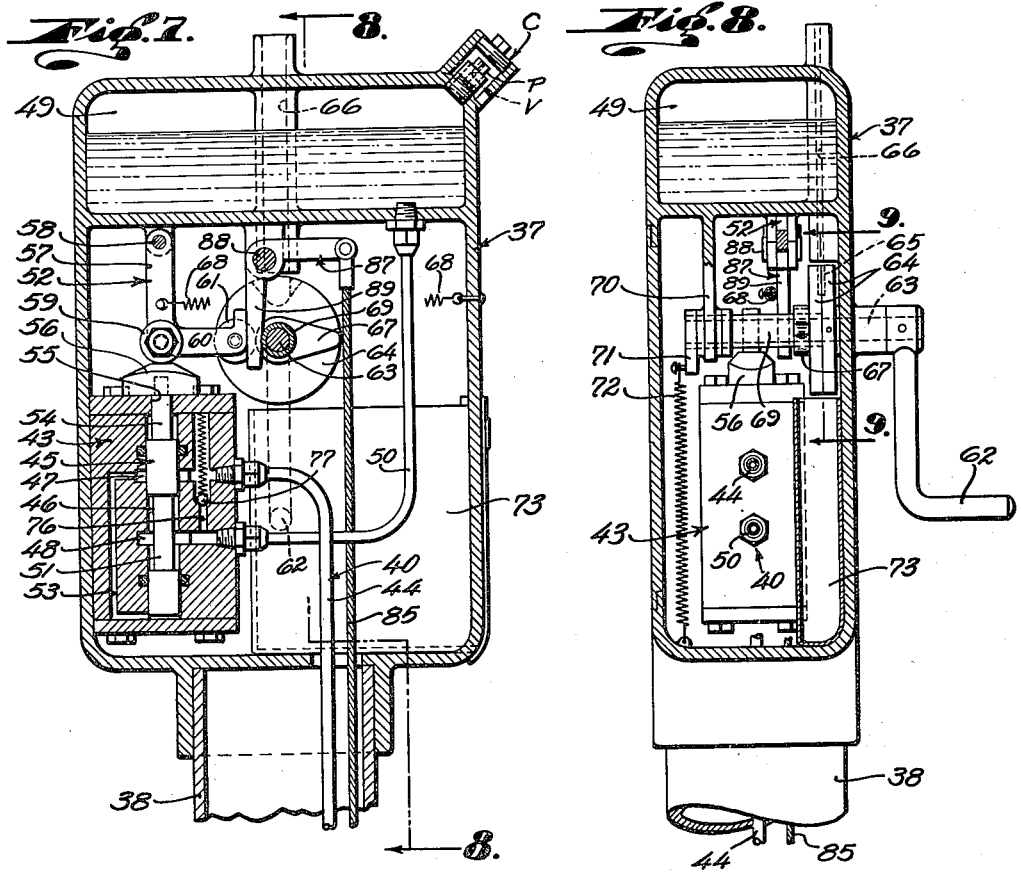
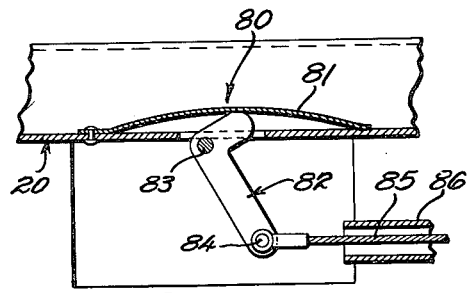
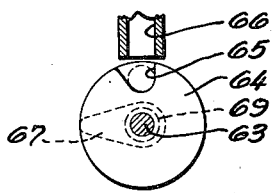
Fred P. Dunn
INVENTOR.
BY
ATTORNEY March 11, 1952 — F. P. DUNN — 2,588,502
PARKING WAY CONTROL SYSTEM
Filed May 9, 1947 — 6 Sheets-Sheet 4
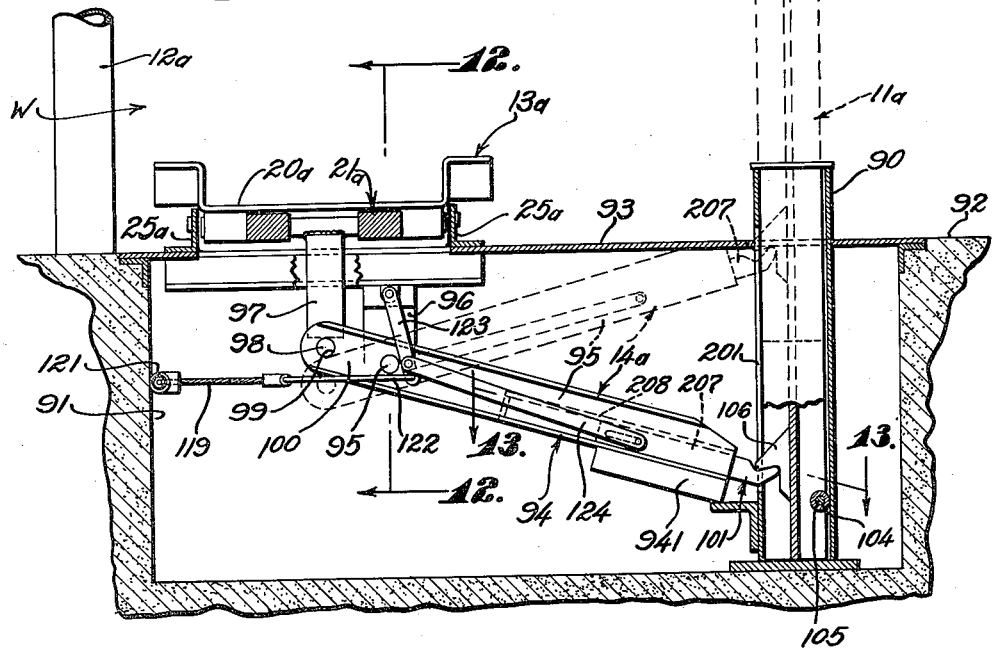
Fig. 11.
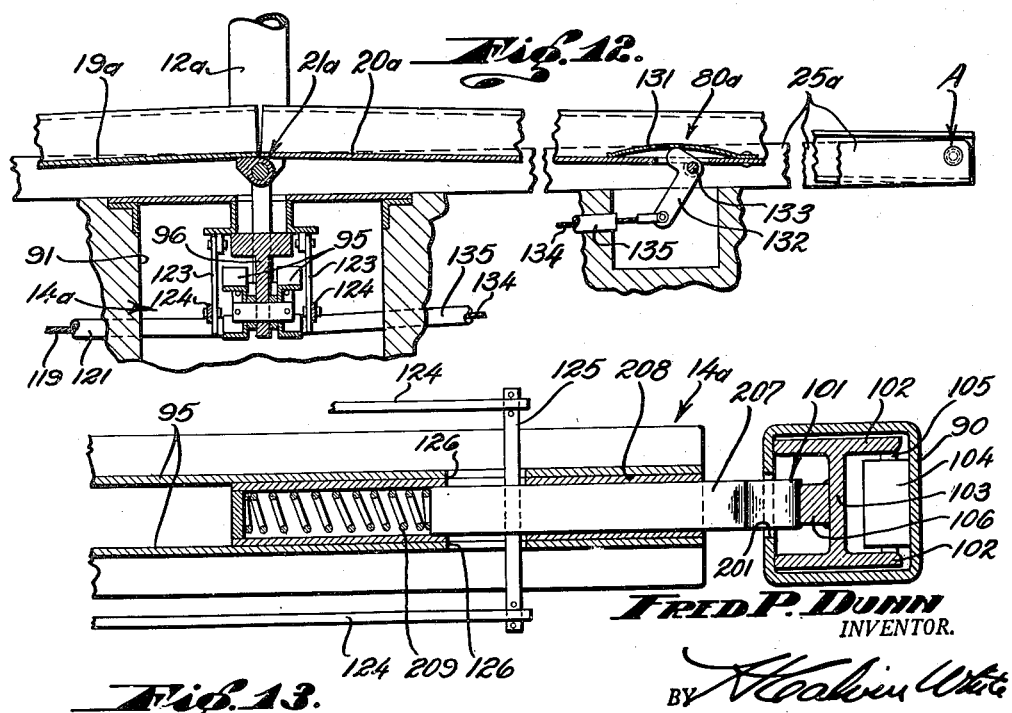
Fig. 12.
Fig. 13.
Fred P. Dunn, INVENTOR.
BY *[signature]*
ATTORNEY March 11, 1952     F. P. DUNN     2,588,502
PARKING WAY CONTROL SYSTEM
Filed May 9, 1947     6 Sheets-Sheet 5
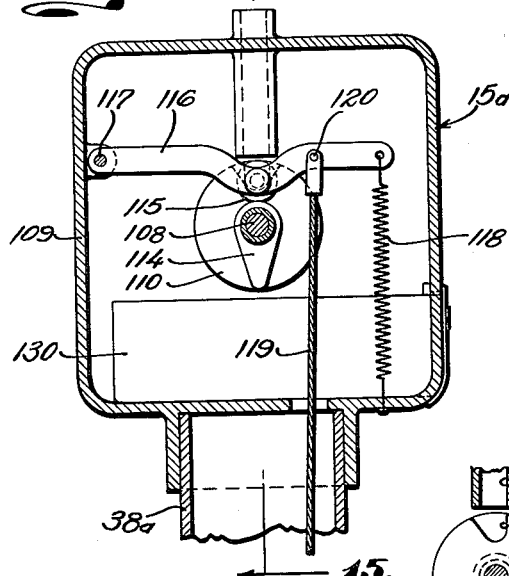
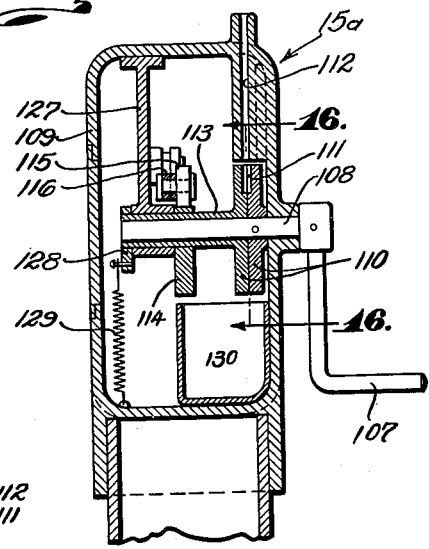
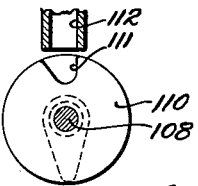
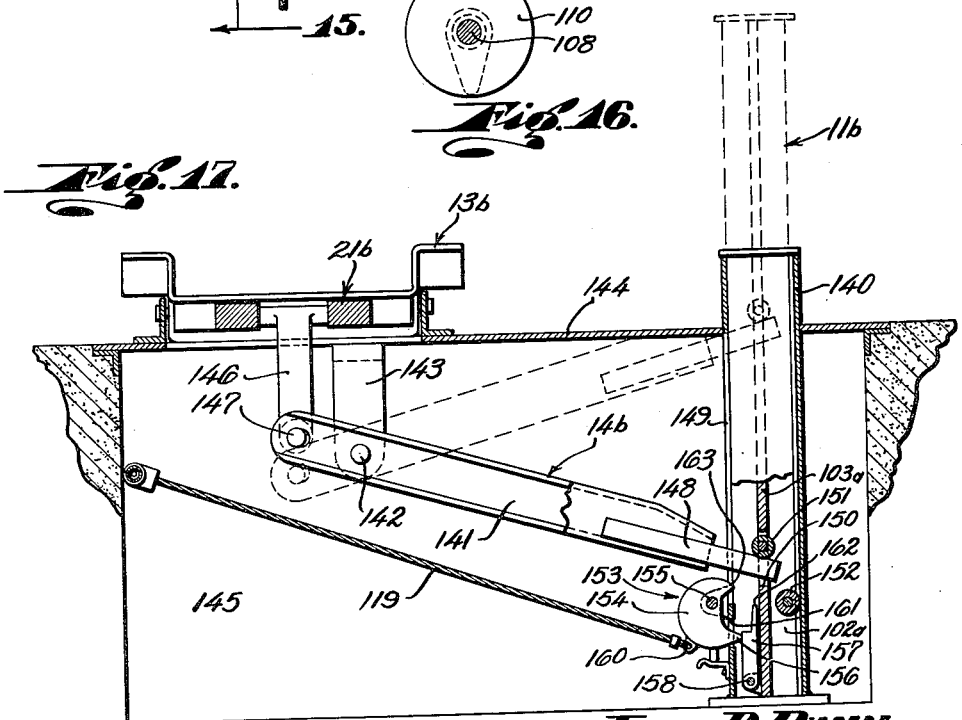
FRED P. DUNN
INVENTOR.
BY
ATTORNEY

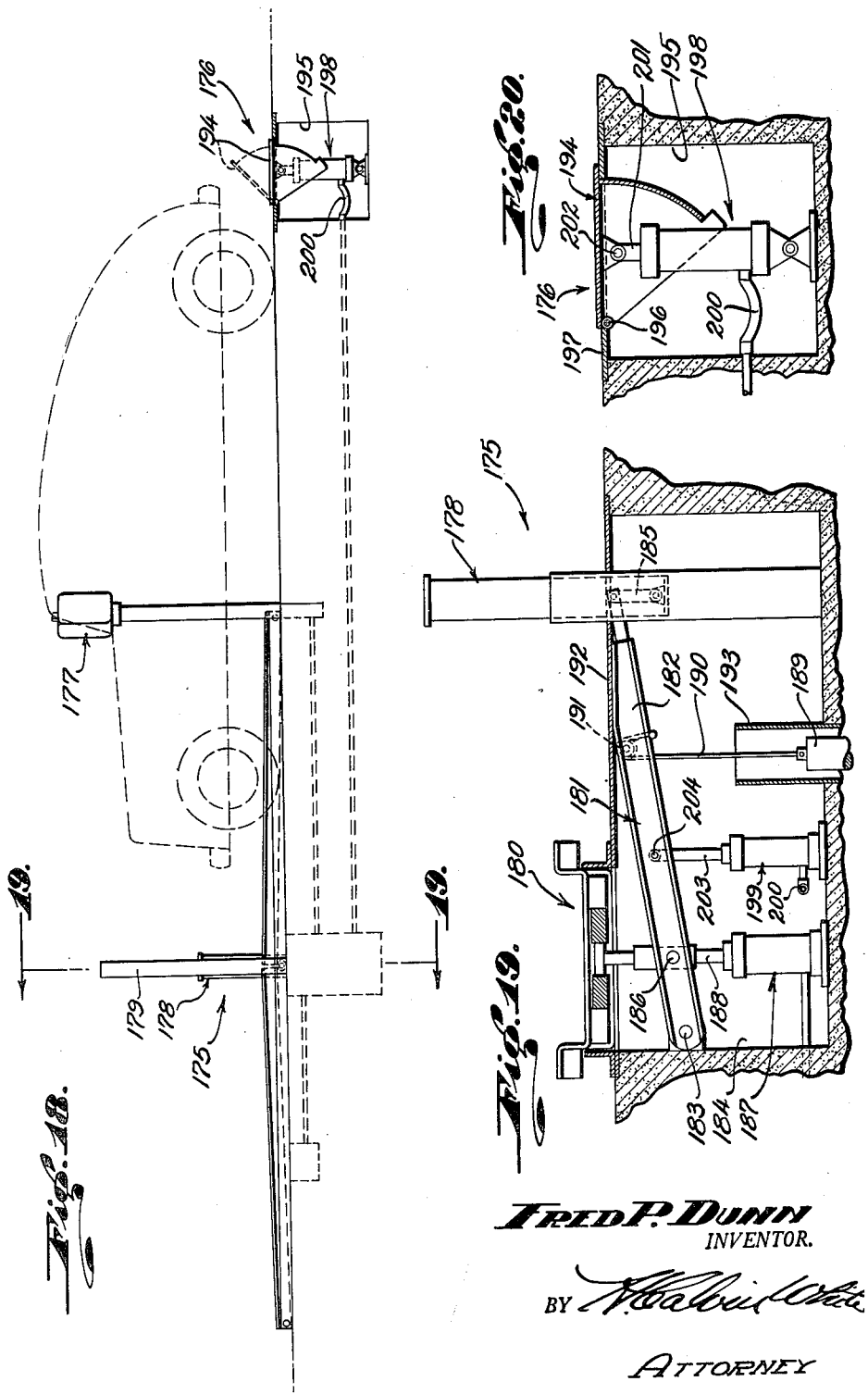

Patented Mar. 11, 1952

2,588,502

UNITED STATES PATENT OFFICE 2,588,502

PARKING WAY CONTROL SYSTEM

Fred P. Dunn, Glendale, Calif.

Application May 9, 1947, Serial No. 746,889

5 Claims. (Cl. 39—8)

This invention has to do with automobile parking area way control systems, i. e. equipment installed for example in an entrance way and presenting a barrier preventing entry of the automobile to its parking location until the barrier is displaced, as under control of a coin operated mechanism. Particularly the invention is concerned with improvements in the general type of controls disclosed in my copending application Serial No. 697,582, filed September 17, 1946, on "Parking Lot Way Control" now Patent No. 2,581,788, issued January 8, 1952.

As with respect to the characteristics of the controls shown in that application, the present types may have as their essential parts a barrier movable vertically into and out of a vehicle arresting position, and connected mechanisms capable of remote control for actuating the barrier between its arresting and vehicle passing positions. Particularly contemplated in both instances is a type of shock resistant barrier displaceable vertically from the ground or passageway level between extreme positions.

One of my major objects now is to provide a type of barrier control responsive to the weight of the vehicle to effect vertical movement of the barrier. In accomplishing this purpose, I may employ an appropriate movable support or member connected to the barrier in a manner such that displacement of the member by the vehicle weight produces an actuation of the barrier. In order, however, for a cycle of the barrier displacement to occur and in a manner permitting advancement of the vehicle through the passageway, ultimate operation of the apparatus is governed by a remote control, such as an adaptable coin control mechanism operable by the vehicle driver to the exclusion of the usual parking attendant.

In its more particular aspects the invention contemplates different specific operative relationships between the weight responsive member, barrier and remote control. Generally, it is contemplated that actuation of such member may cause either raising or lowering of the barrier, and that the functional relationships of the remote control will be governed accordingly.

While the various objects and features of the invention might preliminarily be recited at considerable length, all these as well as the details of certain illustrative embodiments will be most readily understood from the following description of the accompanying drawings, in which:

Fig. 4 is an enlarged vertical sectional view taken on line 4—4 of Fig. 2;

Fig. 5 is a horizontal sectional view taken on line 5—5 of Fig. 4;

Fig. 6 is a transverse vertical view taken on line 6—6 of Fig. 4;

Fig. 7 is an enlarged vertical sectional view taken on line 7—7 of Fig. 1;

Fig. 8 is a transverse vertical sectional view taken on line 8—8 of Fig. 7;

Fig. 9 is a sectional view taken on line 9—9 of Fig. 8;

Fig. 10 is an enlarged fragmentary sectional view taken on line 10—10 of Fig. 1;

Fig. 11 is a view similar to Fig. 4 illustrating another embodiment of the invention;

Fig. 12 is a fragmentary transverse sectional view taken on line 12—12 of Fig. 11;

Fig. 13 is an enlarged fragmentary horizontal section taken on line 13—13 of Fig. 11;

Fig. 14 is a vertical sectional illustrating the modified form of coin control;

Fig. 15 is a transverse section taken on line 15—15 of Fig. 14;

Fig. 16 is a vertical sectional view taken on line 16—16 of Fig. 15;

Fig. 17 is a vertical sectional view illustrating another embodiment of the invention;

Fig. 18 is a side elevation of a control mechanism embodying a secondary stopping means;

Fig. 19 is an enlarged transverse section taken on line 19—19 of Fig. 18; and

Fig. 20 is an enlarged vertical section of a stopping means with the operating cylinder in elevation.

Figure 1:
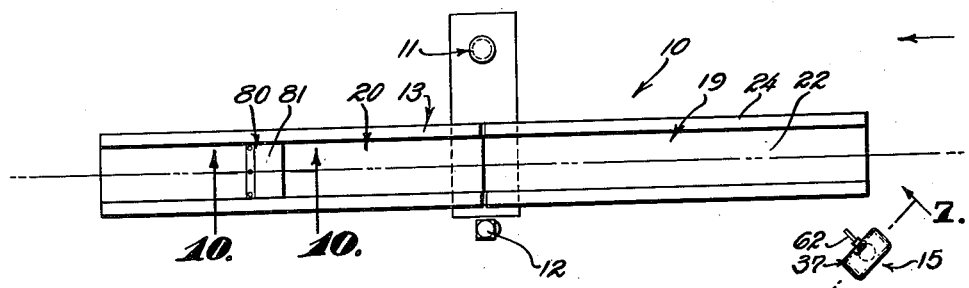
Fig. 1 is a plan view illustrating a typical arrangement of the control mechanism.
Figure 2:
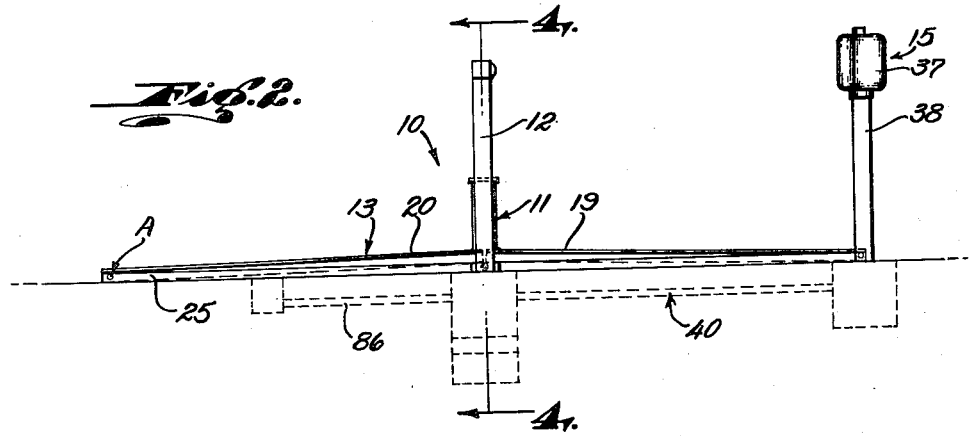
Fig. 2 is a side elevation of Fig. 1.
Figure 3:
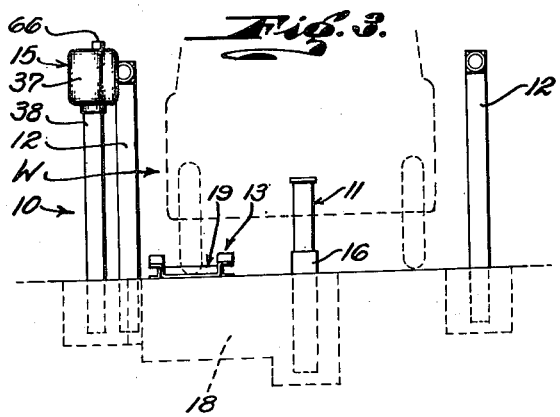
Fig. 3 is a front elevation of Fig. 1 from the entrance side.

Figs. 1 to 10 illustrate one embodiment of the invention for controlling a passageway W for a parking area. The control mechanism generally indicated at 10 includes a vertically movable barrier 11 positioned midway between guide posts 12 bordering the passageway, weight responsive means 13 operated by the automobile passing thereover, and a connection 14 for transmitting movement from the weight responsive means to the barrier 11. The operation of the barrier and the weight responsive means 13 is governed by a coin control 15 located remotely therefrom, preferably positioned to be accessible to the driver of an approaching automobile, as illustrated in Figs. 1 to 3.

The barrier 11 is preferably tubular and movable vertically in a guide tube 16 having its major portion positioned below the ground line 17. A pit 18 for housing the connection 14 and various parts of the control 15 extends transversely of the way W and is covered by a plate 181. The weight responsive means 13 includes a pair of tread plates 19 and 20 normally extending upwardly and inwardly from their elastically anchored ends A, to be connected together by hinge 21. The tread plates extend longitudinally through the way W and are located at one side in line with the wheels at one side of the automobile entering the parking area. These plates are trough shaped to have a major horizontal plate portion 22 provided with vertical side flanges 23 having oppositely outwardly projecting horizontal flanges or aprons 24. Guide angles 25 at opposite sides of the troughs position the troughs and close and space beneath them.

The connection 14 includes a lever 26 pivoted at 27 to a channel member 28 located at the outer end of the pit 18. The lever 26 is preferably formed of a pair of spaced members 29 receiving between them a link 30 depending from the hinge 21. A transverse pin 31 projecting from opposite sides of the link is received in an elongated opening 32 in each of the members 29. The other ends of the members are inwardly convergent and carry an extension 33 operatively connected with the movable barrier 11. As illustrated in Figs. 4 and 5 the extension 33 operates in a vertical slot 331 in the guide tube 16 and projects through an opening 332 in barrier 11. A pair of links 34 have their upper ends pivotally connected at 35 to the projection 33, while their lower ends are pivotally connected at 36 to the bottom of the barrier 11.

The coin control 15, located remote from the barrier and accessible from the driver's seat when the entering automobile has reached a position where its front wheel is on the tread 19, includes rectangular housing 37 carried on the upper end of the post 38. The coin control governs operation of the weight responsive means 13 and subsequent operation of the barrier 11 through the connection 14. While any of various types may be used, I have shown a hydraulic control 40 including a cylinder 41 and ram or piston 42 positioned under the arm 26 and in alinement with link 30 connected to the arm. The cylinder and ram normally prevent actuation of the weight responsive means 13 and retraction of the barrier 11 until the coin control 15 has been conditioned. The cylinder 41 is connected by a conduit 44 with a valve body 43 located remote from the barrier and within housing 37 of the coin control. The valve body typically illustrated contains a slide valve 45 operating in a central bore 46 of the body to control communication between the cylinder port 47 and the reservoir port 48. As shown in Fig. 7, this port is connected with the reservoir 49 in the upper portion of the housing 37 by a conduit 50. An air vent V is provided in the filling plug P to put the reservoir in communication within the atmosphere, and a dust cop C houses the filling pipe. Valve 45 has a reduced portion 51 intermediate its ends to permit communication between ports 47 and 48 and which normally are held out of register by a coin controlled latch 52. A by-pass port 53 puts the lower end of the valve bore 46 in communication with the cylinder port 47 to impose the cylinder pressure on the lower end of the slide valve. The upper reduced end portion 54 of the valve extends through an opening 55 in the valve body and is provided with a head 56.

The coin controlled latch 52, normally holding the valve in its closed position, includes a lever 57 pivoted at 58 to the underside of the reservoir 49 and carrying a roller 59 for engaging the head 56 of the valve. Lever 57 is normally vertical out of axial alinement with the valve 45. A lateral arm 60 of the lever carries a roller 61 at its outer end for the purpose to be subsequently described.

The typical coin control 15 includes an operating crank 62 positioned at one side of the housing 37 and carried on a horizontal shaft 63 extending into the housing. A pair of discs 64 located inside the housing have complementary coin receiving notches 65, normally in register with a coin chute 66 formed integrally with the housing. The outer disc 64 is fixed to the shaft 63 while the inner disc 64 is rotably mounted thereon. The inner disc carries a cam 67 cooperating with roller 61 of the latch 52. A coin received in the registering notches 65 of the discs 64, keys the two discs together for transmission of rotation from the outer disc to the inner disc and cam 67, causing subsequent tripping of the latch 52 against the action of the spring 68.

Upon tripping of the latch 52, the fluid pressure in the cylinder 41, produced by the weight imposed on the plate 19 by the automobile, is conducted through line 44 to the valve 43 and is by-passed through passage 53 to the lower end of the valve 45 to cause its upward movement. The valve portion 51 thus is brought in register with the cylinder port 47 and reservoir port 48, allowing the cylinder to discharge its fluid into the reservoir. Discharge of the fluid from the cylinder 41 allows the weight responsive means to lower, causing the barrier to simultaneously descend through connection 14 and thus permitting entrance of the automobile to the parking area.

To return the coin control to its normal position illustrated in Figs. 7 to 9, I have provided an axially extending sleeve 69 surrounding the shaft 63, the sleeve being connected with the cam 67 and rotatably received in a bearing hanger 70. A crank arm 71 on the outer end of the sleeve is normally held in a vertical position by a spring 72. Turning crank 62 180° trips the latch 52 and brings the cam 67 and arm 71 to positions where springs 68 and 72 cause the inner disc 64 to turn relative to the outer disc 64, releasing the coin and permitting it to drop into the coin receiving box 73. Removal of the coin from the notches 65 in the discs 64 allows the discs 64 to return to normal positions, the outer disc by gravitation of the crank arm 62 and the inner disc 64 by the action of the spring 72 connected with the crank arm 71. When the automobile has passed over the plates 19 and 20, the spring 75 acting against the arm 26 of the connection 14 returns the control to its normal condition in which the barrier 11 is projected to its arresting position. Upward travel of the ram 42 in the cylinder 41 recharges the cylinder by drawing fluid from the reservoir 49 through conduit 50 to reservoir port 48 and hence through port 76, containing a non-return check valve 77, in communication with the cylinder port 47.

To permit leaving the parking area by the passageway W, I may provide in the tread plate 20 a trip 80 for releasing the latch 52 to permit retraction of the barrier. The trip 80 is in the form of a bowed leaf spring 81 extending transversely in the tread plate 20 and adapted to be engaged by the wheel of the outgoing automobile. Under the spring 81 is a bell crank 82 pivoted at 83 to the plate 20 and having its lower arm connected at 84 to a control cable 85. The cable extends through a conduit 86 to the post 38 of the coin control 15 and upwardly through the post to a bell crank 87 in the housing 37. The bell crank 87 is pivotally connected at 88 to the under side of the reservoir 49 and has a downwardly depending arm 89 adapted to engage the end of the lateral arm 60 of the latch 52. The vehicle wheel passing over the trip 80 causes bell crank 82 to pull the cable 85 and operate the bell crank 87 in the housing 37 with consequent tripping of the valve 45. Thereupon the pressure in cylinder 41 is relieved so that the weight of the automobile imposed on the tread plate 20 will cause the barrier 11 to retract.

Figs. 11 to 16, inclusive, illustrate another embodiment of the invention wherein the barrier 11a is normally retracted within the guide tube 90 located midway between boundary posts 12a of the passageway W. The weight responsive means 13a is normally in the up position relative to the barrier 11a and its movement is transmitted through a control mechanism 14a to the barrier 11a. As before, the weight responsive means may include a pair of upwardly and inwardly projecting tread plates 19a and 20a connected together at their opposing ends by a hinge 21a. Guide angles 25a at opposite sides of the tread plates position and close the space beneath them.

The control mechanism 14a, housed below the ground level 92 in pit 91 covered by plate 93, includes a double-ended lever 94 connected intermediate its ends at 95 to a bracket 96 depending from the plate. The arm 94 is preferably formed of a pair of channel members 95 spaced apart to receive the bracket 96, and a downwardly extending projection 97 carried by the hinge 21a for engaging a pin 98 extending between the members 95 and received in openings 99 in the projecting end portion 100 thereof.

A releasable latch 101 projectng through a vertical slot 201 in the guide tube 90, connects the other end of the arm 94 with the barrier 11a to permit its operation being governed by the remote coin control 15a. The barrier, formed of an H-beam having side flanges 102 and a central connecting web 103, is guided for vertical movement within the tube 90 and is provided with a thrust roller 104 carried on a pin 105. A keeper 106, fixed to the central web 103 of the barrier, cooperates with the latch 101 for transmitting movement of the arm 94 to the barrier. The latch 101 is in the form of a retractible plunger 207 reciprocable in a tube 208 carried by the outer end of the arm 94, the latch being urged by spring 209 into engagement with the keeper 106. The arm 94 is normally held down and the weight responsive means 13a held up by a weight 94I attached to the outer end of the arm 94.

Downward movement of the weight responsive means transmits upward movement to the barrier through the double-ended arm 94. As an automobile entering the way W approaches the barrier 11a, its front wheel will be resting on the tread plate 19a, causing the barrier to immediately rise, stopping the automobile where the romote ly control 15a will be accessible to the driver seated in the automobile. The coin control 15a is similar to the above described coin control 15 and includes a manually operated crank 107 carried on the shaft 108 extending into the housing 109. A pair of discs 110 similar to discs 64 described above, have in their opposing faces notches 111 registering with the coin chute 112. The outer disc 110 is fixed to the shaft 108 while the inner disc 110 is rotatably carried thereon. The inner disc has an integral sleeve extension 113 rotatable on the shaft 108 and carrying the cam 114 for engagement with a roller 115 rotatably carried on a lever 116 pivoted at 117 to the housing 109. Spring 118 connected with the outer end of the lever 116 holds the roller 115 in engagement with the cam 114. A control cable 119 connected with the lever 116 at 120, extends downwardly through the post 38a of the coin control 15a and through the conduit 121 to a point within pit 91. The other end of the control cable 119 is connected with a bail 122 attached to a pair of pivoted levers 123 located at opposite sides of the bearing brackets 96 adjacent the pivot 95 of the arm 94. A pair of connecting rods 124 extend from the lower ends of the pivoted levers 123 to connect with the retractible bolt 207 by a wrist pin 125 extending through elongated slots 126 in guide tube 208 and members 95, as illustrated in Figs. 11 and 13.

The inner end of the shaft 108 and sleeve 113 of the coin control 15a are rotatably carried by a bearing hanger 127. A crank arm 128 attached to the outer end of the sleeve 113 holds the inner disc 110 in its normal position in register with the coin chute 112 by a spring 129, while the crank arm 107 on the shaft 108, carrying the outer disc 110, holds the notch 111 in the outer disc in register with the coin chute, by gravitation.

In considering the operation of the form illustrated in Figs. 11 to 16, assume the front wheel of the automobile entering the way W to advance upon the weight responsive means 13a, causing the barrier 11a to be extended to the dotted line position of Fig. 11. Upon insertion of the proper coin into the then accessible coin control 15a, the coin enters the registering notches 111 of the discs 110, keying the discs together to transmit rotation on the crank 107 to the cam 114. Rotation of the crank and cam 114 180° pulls the control cable 119 and retracts the latch 101 from the keeper 106, allowing the barrier 11a to drop. As the cranks 107 and 128 pass over-center, spring 129 causes the inner disc 110 to rotate relative to the outer disc 110, releasing the coin and allowing it to fall into the coin box 130. The inner disc 110 continues its rotation to the position illustrated in Fig. 16, where its notch 111 is again in register with the coin chute 112. The outer disc 110 also has continued rotation to bring its notch 111 again in register with the coin chute.

A trip 80a, which may be identical with the trip 80 described above, is carried by the trip plate 20a to permit an outgoing automobile to pass the barrier. The trip 80a includes a bowed leaf spring 131 extending transversely in the plate 20a to be depressed by the wheel of the vehicle. A bell crank 132 pivotally carried by the plate 20a on pin 133 is actuated by depression of the leaf spring. The lower end of the bell crank is connected to one end of a control cable 134 extending through a conduit 135 to a point within the pit 91, the other end of the cable being attached to the bail 122 connected to latch 101. It will be seen how an outgoing vehicle causes the weight responsive means to elevate the barrier immediately upon driving onto the tread plate 20a. Further advancement of the vehicle causes the trip 80a to be actuated, releasing the latch 101 from the keeper 106 on the barrier and permitting the barrier to drop.

The form of the invention illustrated in Fig. 17 includes a barrier 11b normally in a retracted position within its guide tube 140, and a weight responsive means 13b actuated by the automobile and connected with the barrier through a control mechanism 14b. The barrier 11b and means 13b may be identical in construction with the above described corresponding parts except for the connection between the control mechanism and the barrier. The control mechanism 14b includes a double ended lever 141 pivoted at 142 with a bracket 143 depending from the cover plate 144 of the pit 145. One end of the lever 141 is connected with a downwardly depending link 146 of the hinge connection 21b as at 147. The other end of the lever 141 carries an extension 148 operating in a vertical slot 149 in the guide tube 140 and projecting into an opening 150 in the central web 103b of the barrier 11b. A roller 151 carried by the central web cooperates with the extension 148 to permit free operation of the barrier. A roller 152 carried by the spaced flanges 102b of the barrier travels the back wall of the guide tube 140 to take the thrust of the barrier during its up and down movement. Latch 153, controlling the operation of the barrier 11b, includes a weighted member 154 pivoted at 155 to the stationary guide tube 140. A lower projection 156 of this member projects through notch 161 in the guide tube 140. A latch 157, pivotally mounted at 158 on the barrier 11, is normally held in a released condition by the projection 156. When the latch 157 is held released by the member 154, an automobile driving onto the weight responsive means 13b will cause the barrier 11b to be extended to the arresting position preventing entrance through the way, independently of any antecedent operation of the coin control.

A coin control, identical to the coin control 15a described above, may have its control cable 119 attached to the weighted member 154 as at 160. Being properly positioned from the weight responsive means 13b, the coin control is made accessible from the driver's seat before the front wheel of the automobile has reached the weight responsive means 13b, and while the barrier 11b is in its retracted position illustrated in Fig. 17. Upon reception of a coin in the registering notches 111 of the control discs 110, rotation of the crank 107 will cause the cam 114 to pivot the lever 116, resulting in tripping of the control latch 153. Projection 156 on the weighted member 154 thus is retracted, allowing the latch 157 to engage the upper end of the notch 161. As the automobile advances onto the weight responsive means 13b, the barrier 11b will rise only a distance sufficient to move the latch 157 into engagement with the upper end of the notch 161 while the outer end 162 of the latch engages a second projection 163 on the member 154 to reset the control latch 153. Engagement of the latch 157 with the upper end of the notch 161 prevents further movement of the barrier 11 permitting the automobile to enter the area.

In Figs. 18 to 20 I have illustrated a secondary stopping means associated with a control mechanism 175 similar to the control mechanism illustrated in Figs. 1 to 10 of the drawings, for preventing a successive car from entering the parking area until the first car has completely passed the control mechanism 175. Fig. 18 shows a retractable stop 176 located immediately in back of an approaching vehicle when it has reached the position illustrated in dotted lines, at which the coin control 177 is accessible to the driver in the vehicle.

The control mechanism 175 includes generally barrier 178 positioned in the path of the vehicle between boundary posts 179 located at opposite sides of a passageway, and a weight responsive means in the form of a depressible tread plate 180 located at one side of the passageway in line with the wheels of the vehicle. A connection 181 between the tread plate and the barrier is in the form of an arm 182 pivotally mounted at one end 183 to the wall of a pit 184. The other end of the arm 182 is connected with the barrier by a link 185, while the tread plate 180 is connected intermediate its ends at 186 adjacent the pivot 183.

The tread plate and the barrier are normally in their raised position preventing entrance into the parking area. A control cylinder 187 having its plunger 188 connected with the arm 182 and positioned directly below the tread plate is under the control of a remote valve located in the coin control unit 177. The coin control unit may be identical with the unit described in Figs. 7 and 8, and is conditioned for operation by the driver of an approaching vehicle. The operation of the barrier 178, tread plate 180 and their associated control parts, are identical with the form referred to above, except that a weight 189 replaces the spring 75 for returning the barrier and the weight responsive means to their raised positions. The weight 189 is connected with the arm 182 by a cable 190 trained over an idler roller 191 attached to the cover plate 192 of the pit 184 and operates vertically in a housing 193.

Stop 176 located in advance of the control mechanism 175 permits only one vehicle to pass through the control for each actuation of the coin control 177. The stop 176 includes a pivoted abutment 194 normally retracted in a pit 195 and pivoted at 196 to a cover plate 197 over the pit. Control cylinders 198 and 199 located in the pits 195 and 184, respectively, are interconnected by a conduit 200 and operate alternately in opposite directions. The control cylinder 198 has its plunger 201 connected with the pivoted abutment at 202, while the cylinder 199 has its plunger 203 connected at 204 with the arm 182.

When a vehicle reaches the dotted position illustrated in Fig. 18, the weight of the car is imposed on the tread plate 180, at which time the rear wheel of the vehicle has passed the stop 176 and the coin control unit 177 is accessible to the driver in the vehicle. Upon insertion of the coin and actuation of the coin control unit, the tread plate is permitted to lower causing simultaneous retraction of the barrier 178. Lowering of the barrier 178 through the connection 181 causes the plunger 203 in cylinder 199 to displace the fluid therein and simultaneous projection of the stop 176 by the control cylinder 198 connected therewith.

Retraction of the barrier 178 permits the vehicle to enter the parking area while the stop 176 prevents a successive vehicle from entering the control mechanism 175 until the entering vehicle has passed completely over the weight responsive means 180, at which time the weight 189 restores the barrier 178 and the tread plate 180 to their raised positions and simultaneously retracts the stop 176.

I claim:

1. Control mechanism for an automobile parking area having a way through which automobiles pass, comprising a barrier movable vertically in said way to arrest and permit advancement of an automobile therethrough, means responsive to weight imposed thereon by the automobile for retraction of the barrier to permit advancement through said way, control mechanism connecting said means with the barrier, a cylinder and piston means operable by retraction of the barrier and normally preventing said retraction, and a valve controllable at a location remote from said barrier and governing operation of said cylinder and piston means.

2. Control mechanism for an automobile parking area having a way through which automobiles pass, comprising a barrier movable vertically in said way to arrest and permit advancement of an automobile therethrough, means responsive to weight imposed thereon by the automobile for retraction of the barrier to permit advancement through said way, control mechanism connecting said means with the barrier, a cylinder and piston means operable by retraction of the barrier and normally preventing said retraction, and a remote coin controlled valve governing operation of said cylinder and piston means.

3. Control mechanism for an automobile parking area having a way through which automobiles pass, comprising a barrier movable vertically in said way to arrest and permit passage of an automobile therethrough, a depressible member in the path of the automobile and responsive to the weight thereof, a connection for transmitting movement from said member to the barrier, a cylinder and piston means under said member operable by movement of said member and normally preventing said movement and a remote coin controlled valve governing operation of said cylinder and piston means.

4. Control mechanism for an automobile parking area having a way through which an automobile advances into the area, comprising a barrier projectible upwardly in said way from adjacent the ground to a vehicle arresting position and displaceable downwardly to a vehicle passing position, means mounting the barrier for movement to said passing position in response to the weight of the automobile, piston and cylinder holding means operable by movement of said barrier and normally maintaining the barrier in said arresting position, a valve controllable at a location remote from said barrier and governing operation of said piston and cylinder means, and mechanism conditioned by reception of a coin for actuating said valve to release said holding means independently of the weight of the automobile.

5. Control mechanism for an automobile parking area having a way through which automobiles pass, comprising a weight responsive member in said way movable downwardly by the weight of an automobile imposed thereon, a barrier in said way mounted for movement between an active position in which it projects upwardly in said way from adjacent the ground to prevent the passage of an automobile and a downwardly retracted position permitting said passage, means including a lever pivotally mounted beneath the surface of the ground and mechanically interconnecting said weight responsive member and said barrier so that downward movement of the weight responsive member effects movement of the barrier in a predetermined direction between said positions, means positioned beneath said weight responsive member and adapted to prevent the downward movement thereof, and coin responsive mechanism governing the effectiveness of said last mentioned means to prevent said downward movement.

FRED P. DUNN.

REFERENCES CITED

The following references are of record in the file of this patent:

UNITED STATES PATENTS

| Number | Name | Date |
|---|---|---|
| 467,556 | Nelson | Jan. 26, 1892 |
| 1,247,405 | Jay | Nov. 20, 1917 |
| 1,616,809 | McClellan et al. | Feb. 8, 1927 |
| 1,853,934 | Shetler | Apr. 12, 1932 |
| 1,884,447 | White | Oct. 25, 1932 |
| 1,988,889 | Boardman | Jan. 22, 1935 |
| 2,015,607 | Shinn | Sept. 24, 1935 |
| 2,073,834 | Duany et al. | Mar. 16, 1937 |
| 2,200,639 | Rice | May 14, 1940 |

FOREIGN PATENTS

| Number | Country | Date |
|---|---|---|
| 20,978 | Australia | Jan. 30, 1936 |
| 100,747 | Australia | Apr. 22, 1937 |
| 202,579 | Switzerland | Jan. 31, 1939 |